(12) United States Patent
Kostyrko et al.

(10) Patent No.: US 12,528,651 B2
(45) Date of Patent: Jan. 20, 2026

(54) METHOD FOR IDENTIFYING AND TRACKING SINGLY CONVEYED PRODUCTS

(71) Applicant: Uhlmann Pac-Systeme GmbH & Co. KG, Laupheim (DE)

(72) Inventors: Dmytro Kostyrko, Laupheim (DE); Christian Trautwein, Laupheim (DE); Norbert Damaschke, Laupheim (DE); Bruno Schiele, Laupheim (DE); Andreas Strobel, Laupheim (DE); Tom Kreutzer, Laupheim (DE); Volker Kümmel, Laupheim (DE)

(73) Assignee: Uhlmann Pac-Systeme GmbH & Co. KG, Laupheim (DE)

(*) Notice: Subject to any disclaimer, the term of this patent is extended or adjusted under 35 U.S.C. 154(b) by 343 days.

(21) Appl. No.: 18/131,096

(22) Filed: Apr. 5, 2023

(65) Prior Publication Data

US 2023/0312264 A1    Oct. 5, 2023

(30) Foreign Application Priority Data

Apr. 5, 2022 (EP) .................................. 22166717

(51) Int. Cl.
*B65G 47/244* (2006.01)
*B65G 43/08* (2006.01)

(52) U.S. Cl.
CPC .......... *B65G 43/08* (2013.01); *B65G 47/244* (2013.01); *B65G 2203/0216* (2013.01); *B65G 2203/041* (2013.01)

(58) Field of Classification Search
CPC .......... B65G 2203/04; B65G 2203/041; B65G 2203/0216; B65G 47/244; B65G 43/08
(Continued)

(56) References Cited

U.S. PATENT DOCUMENTS 2,979,746 A * 4/1961 Willsey ................ A01K 43/005
15/3.13
3,685,636 A * 8/1972 Putin .................... B65G 49/085
198/790
(Continued)

FOREIGN PATENT DOCUMENTS

CN    209085712 U    7/2019
DE    3241489 A1    5/1984
(Continued)

OTHER PUBLICATIONS

EP2788127 (Year: 2015).*
European Search Report dated Sep. 19, 2022.

*Primary Examiner* — Gene O Crawford
*Assistant Examiner* — Lester Rushin, III
(74) *Attorney, Agent, or Firm* — Dickinson Wright PLLC

(57) ABSTRACT

A system and method for identifying and tracking singly conveyed products, which are cylindrical at least in regions, and have a peripheral surface to which a marking is respectively applied. The products are conveyed in a direction of transport by a transport device, and during conveyance are rotated by a friction element that comes into engagement with each product by friction as the products are being conveyed. The marking applied to the peripheral surface of each product is read by a stationary camera system having at least two cameras, as the respective product is being rotated.

19 Claims, 4 Drawing Sheets

(58) Field of Classification Search
USPC ......................................................... 198/411
See application file for complete search history.

(56) References Cited

U.S. PATENT DOCUMENTS

| | | | | |
|---|---|---|---|---|
| 5,058,724 A | * | 10/1991 | Hinton | B65G 47/244 |
| | | | | 198/379 |
| 6,012,344 A | * | 1/2000 | Halbo | G01N 21/9009 |
| | | | | 198/339.1 |
| 6,081,326 A | | 6/2000 | Rousseau et al. | |
| 2014/0284380 A1 | | 9/2014 | Toedtli | |
| 2021/0264351 A1 | | 8/2021 | Carvallo | |
| 2022/0414861 A1 | * | 12/2022 | Turnquist | G06T 7/0004 |

FOREIGN PATENT DOCUMENTS

| | | |
|---|---|---|
| WO | 2013083544 A1 | 6/2013 |
| WO | 2014031576 A1 | 2/2014 |
| WO | 2018184760 A1 | 10/2018 |

\* cited by examiner

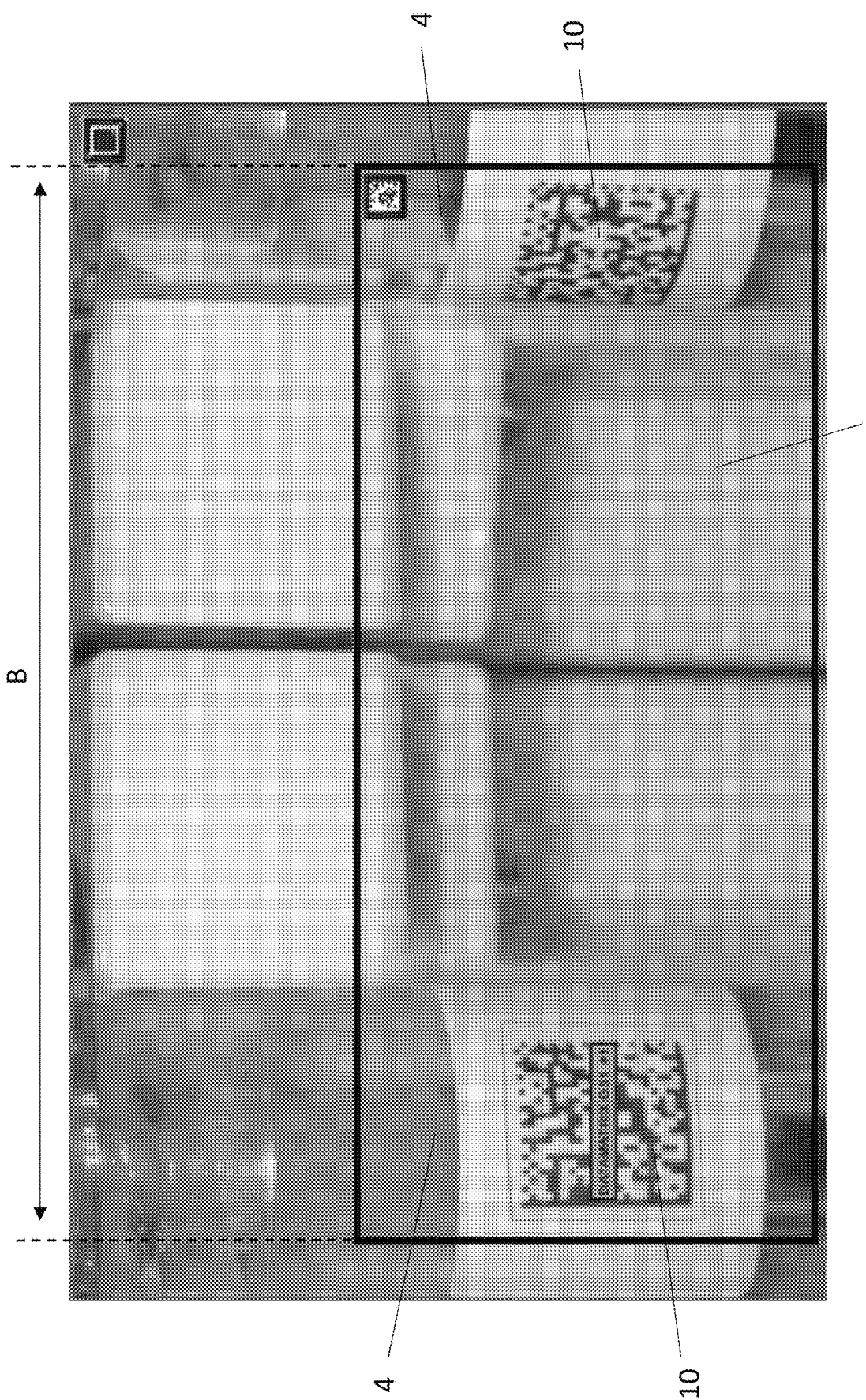

METHOD FOR IDENTIFYING AND TRACKING SINGLY CONVEYED PRODUCTS

CROSS-REFERENCE TO RELATED APPLICATIONS

This application claims the benefit of and priority under 35 U.S.C. § 119 to European Patent Application No. 22 166 717.3, filed Apr. 5, 2022, the contents of which is incorporated herein by reference in its entirety.

FIELD

The present disclosure relates to a method for identifying and tracking singly conveyed products.

BACKGROUND

Many products, in particular in the pharmaceutical industry, are provided with optical markings (QR codes, data matrix code, etc.) to enable clear identification and tracking of the individual product.

If these markings are to be scanned during the conveying of the products, the products must be aligned with respect to the respective camera in such a way that the marking faces toward the camera or, in the case of products without pre-orientation, the product is inspected from different sides by means of a camera.

SUMMARY

It is an object of the present disclosure to ensure, by use of as little equipment as possible, robust recognition of markings applied to products without pre-orientation, while the products are being transported.

According to an aspect of the disclosure, the method for identifying and tracking singly conveyed products, in particular medical products such as syringes, ampoules, vials or inhalers, wherein the singly conveyed products are at least partially rotationally symmetrical, in particular cylindrical, and have a peripheral surface to which a marking, in particular a code, is respectively applied, comprises the steps of:
  conveying the products by means of a transport device in a direction of transport, wherein the transport device has a plurality of successive cells for receiving respectively one product, wherein each product is rotatably received in the associated cell,
  during conveying, rotating each product by means of a friction element which, as the products are being conveyed, comes into engagement with each product by friction, preferably static friction, and
  reading the marking applied to the peripheral surface of each product by means of a stationary camera system having at least one camera, as the respective product is being rotated.

This method ensures robust marking recognition, during conveyance, of products conveyed without pre-orientation. The products are received in the transport device without pre-orientation, such that the orientation of the marking in the cell of the transport device is random. It is only by rotation of the products that all portions of the peripheral surface of the product are presented to the camera system, and at least one 360° rotation of each product in front of the camera system is necessary to reliably sense each marking by means of the camera system.

The effect of the friction element on the product is similar to mechanical braking. Since the product is mounted in a rotatable manner, it executes a rotation and rolls on the friction element.

In a preferred embodiment, the friction element is arranged in a stationary position. This makes the structural design particularly simple. During conveying, each product rolls on the stationary friction element and thus, as it rotates, offers the camera system a particular circumferential portion of the peripheral surface for inspection. The friction element can also be moved and then preferably runs at a constant speed in the direction opposite to the direction of transport of the products.

In a preferred embodiment, the friction element is a strip. It may also conceivably be a revolving belt, a rotatable roller or a rotatable disk.

In a particularly preferred embodiment, the friction element has an elastomer material, at least on the side of the friction element that faces toward the products. The elastomer is deformed by the passing products, and the products are particularly reliably put into rotational motion by means of static friction.

It is preferred that, on each product, the engagement of the friction element for the purpose of rotating the product be effected in the region of the peripheral surface of the product. Constant and secure rotation of the product is thereby ensured.

For secure and uniform rotation of each product without slippage, it is preferred that the coefficient of friction between the friction element and the material of the product is preferably at least 0.2, more preferably at least 0.3, particularly preferably at least 0.4. The friction value in this case is determined according to DIN ISO 8295 from the year 1995.

The receptacle of each cell preferably has a shaped groove by means of which the product is held in position.

Each product is preferably supported against its gravity in its receptacle, and rotating the product is effected about an axis of rotation of the product. The axis of rotation of the product is usually perpendicular to the direction of transport. To support the product against its gravity in the receptacle, for example a product flange may be used, which is supported on one or more shoulders of the receptacle throughout the entire rotation of the product through 360°. It is also conceivable for a base portion of the product to be supported on a support base of the cell.

It is in each case preferred that the product be mounted, in the receptacle, on rollers of which the axis of rotation is, for example, parallel to the axis of rotation of the product. In a particularly preferred embodiment, the peripheral surface of the product is in contact with the rollers. This minimizes the friction between the product and the cell. Alternatively or additionally, it is conceivable to provide further measures that cause the product to slide easily when rotating in the cell and reduce the coefficient of friction between the product and the receptacle. For example, the shoulder, or the support base, of the cell may have a hard, smooth material at least on the side that faces toward the product.

In a preferred embodiment, conveying is effected at a uniform translational speed, and rotating is effected at a uniform rotational speed. This provides for reliable sensing of the marking by the camera system and facilitates the evaluation of the recorded camera images.

The translational speed of the products may in principle be as low as 1 mm per second, but preferably is usually at least 10 mm per second, more preferably at least 60 mm per second, particularly preferably at least 100 mm per second.

The diameter in the rotationally symmetrical region of the products is preferably between 5 and 40 mm, more preferably between 6 and 30 mm.

The rotational speed of the products is usually from 0.08 to 8 revolutions per second, preferably from 0.1 to 6 revolutions per second, more preferably from 0.5 to 6 revolutions per second, particularly preferably from 1 to 6 revolutions per second.

The camera system may have a single camera. Preferably, however, the camera system has a plurality of cameras, arranged in succession in the direction of transport and preferably in a line, but at least a first and a second camera. In this way, a higher throughput of products and a higher transport speed can be realized than with a single camera, because each individual cameral has to check for marking only a partial circumference of the peripheral surface of the product. In a preferred embodiment, the camera system may also have three, four or even more cameras. The rotation of the products is preferably effected continuously in the region of the entire camera system, i.e. along all cameras present.

It is preferred in this case that the active fields of view of the plurality of cameras do not spatially overlap in the region of the products. This helps to eliminate double sensing of a marking by a plurality of cameras.

The "active field of view" of a camera may already correspond to the actual field of view of the camera due to its design. Alternatively, the actual field of view of the camera may be restricted to the required active field of view by means of suitable software settings, such that only the contents of this region are recorded or evaluated.

The active field of view of each camera may be, for example, rectangular. The width of the "active field of view" of each camera in the region of the products is usually not greater than the respectively same distance between two cells of the transport device, preferably between 10 and 60% smaller, more preferably between 20 and 40% smaller. This ensures that at any point in time at most one marking of a product can be identified in the active field of view of a camera, but not any further marking of a second product. Alternatively, it is also possible for two markings of successive products to be read simultaneously by means of one camera.

For safety reasons, the height of the active field of view of each camera is usually selected so as to be slightly greater than the height of the marking, for example between 30% and 150% greater.

The recognition of a marking on the peripheral surface of the products by a camera will usually be possible when the marking is arranged in a rotation angle range of the product of between +/−30°, sometimes even only in a range of between +/−20° or between +/−15° relative to a central zero line. The central zero line in this case corresponds to the line on the product toward which the camera view is directed perpendicularly at a particular point in time.

In principle, it is possible to leave the active field of view of each camera continuously active and thus to record images in this field of view all the time. However, it is advantageous if each camera is only activated intermittently. In this way, there is no need to record images at irrelevant points in time.

In these cases, a time interval of image recording by a camera is usually no longer than the period in which the transport device advances by the distance between two cells, preferably is 1 to 30% shorter, more preferably 2 to 25% shorter.

The activation time of each camera preferably substantially coincides with the time period in which a product is present in the active field of view of the camera. The activation time of each camera is preferably predefined externally via a controller, for example via a programmable logic controller of the overall system, that knows the respective location of each product.

If a plurality of cameras is used, it is generally preferred that all downstream cameras be deactivated for the time period of the passage of a particular product, as soon as a marking has been recognized for this product by one of the upstream cameras. Moreover, when the marking has been sensed by a particular camera, this camera is also preferably deactivated until a new product enters its active field of view or the field of view is reactivated for the next product. In this context, "deactivated" means either that image recording by the camera is switched off or that the recorded image data are not evaluated.

Preferably, the correlation between the translational speed of the transport device, the diameter of the rotationally symmetrical region of the product, the distance between the cells of the transport device, the width of the active field of view of the cameras in the region of the products, and the distance between the cameras is set in such a manner that a second circumferential portion of the product sensed by the active field of view of the second camera during the rotation of the product differs from a first circumferential portion of the product sensed by the active field of view of the first camera during the rotation of the product. In this regard, the activation time of each camera must also be appropriately coordinated with the other parameters if the cameras are not continuously recording images.

It is preferred in this case that the first and the second circumferential portion overlap at least by an extension of the marking in the circumferential direction of the rotationally symmetrical region. If there are exactly two cameras, a corresponding overlapping at both edges of the circumferential portions is useful.

If additionally there is a third camera, it is intended that the third circumferential portion of the product, sensed by the active field of view of the third camera during rotation of the product, differs from the first and second circumferential portions of the product. If there is a fourth camera, it is intended that the fourth circumferential portion of the product, sensed by the active field of view of the fourth camera during rotation of the product, differs from the first, second and third circumferential portions of the product. The same applies to any other cameras that may be present. In each of these cases, it is preferred that respectively one of the circumferential portions covered by one of the cameras overlaps with two other circumferential portions by at least the roll distance of the marking in the circumferential direction of the rotationally symmetrical region. Overall, the plurality of cameras in total thus cover the entire circumference of the peripheral surface of the product, with overlaps in each of the overlapping regions. In this way, maximum throughput can be achieved while ensuring reliable operation.

Preferably, an evaluation frequency of the at least one camera is in the range of from 20 to 60 images per second, preferably in the range of from 30 to 50 images per second.

The marking is preferably a 2D code, in particular a QR code or a data matrix code. Also conceivable, however, are other commercially available markings that can be recognized optically.

The marking is usually arranged along the peripheral surface of the product, and therefore exhibits a curvature in the circumferential direction of the peripheral surface.

The cameras of the camera system are preferably digital image capture devices, or code readers.

Usually, the predefined distance between successive cells of the transport device is in the range of from 20 mm to 100 mm, more preferably in the range of from 20 mm to 65 mm.

The distance between the camera and the product is normally between 50 mm and 120 mm, preferably between 60 mm and 80 mm.

The distance between two successive cameras is normally between 50 mm and 150 mm, preferably between 70 mm and 100 mm.

The evaluation and/or decoding of the recorded images and/or codes may be effected either in an integrated evaluation unit in the camera system itself or in an external evaluation unit. This may be, for example, part of the machine controller or supply data to it.

The assignment of the product and the marking is usually effected in a superordinate system, for example a programmable logic controller.

In particular, the data content of the code may be assigned to the product after having been decoded in a shift register, and/or transmitted to a controller and/or transmitted to a database.

BRIEF DESCRIPTION OF THE DRAWINGS

FIG. 4 shows a possible image recorded by a camera in the context of one embodiment of the method according to the disclosure.

DETAILED DESCRIPTION

Figure 1:
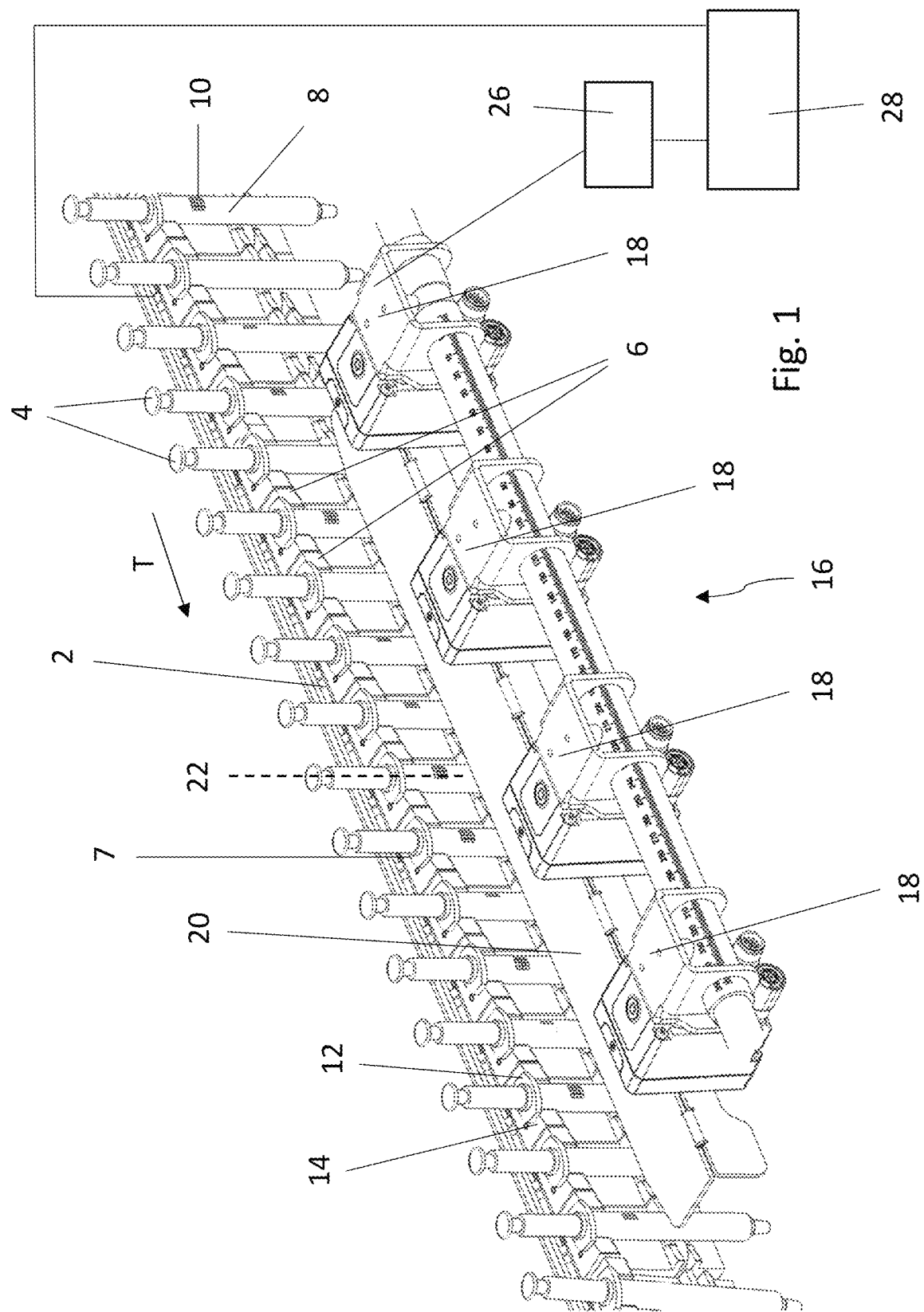
FIG. 1 is a perspective view of a device for executing one embodiment of the method according to the disclosure.

Represented in FIG. 1 is a possible system for executing one embodiment of the method according to the disclosure.

In a transport device 2, products 4, in particular medical products such as syringes, ampoules, vials or inhalers, are conveyed singly and continuously in a direction of transport T, at a constant translational speed. The transport device 2 has individual cells 6, in each of which a product 4 is received in a receptacle 7. The cells 6 are each of identical design. The cells 6 are at an identical distance D from each other (see FIG. 2). The products 4 each have, in regions, a peripheral surface 8 on which generally one marking 10 is applied, for example glued-on as a label or directly printed, in each case.

The products 4 are initially rotatably received in the cells 6 in an arbitrary orientation. Each product 4 will thus generally have a different orientation. In the present case, the products 4 are in the form of syringes having a product flange 12 resting on a shoulder 14 of the respective cells 6, where the product 4 is supported against its gravity. In this case, the products 4 hang vertically in the respective receptacles 7.

The products 4 are guided past a camera system 16 in the direction of transport T, which in the exemplary case represented is composed of four cameras 18. The individual cameras 18 are arranged so that they can be moved in relation to each other in the direction of transport T in order to ensure an optimum setting for different products 4 or product formats. During operation, however, they remain stationary in their preset position.

Figure 3A:
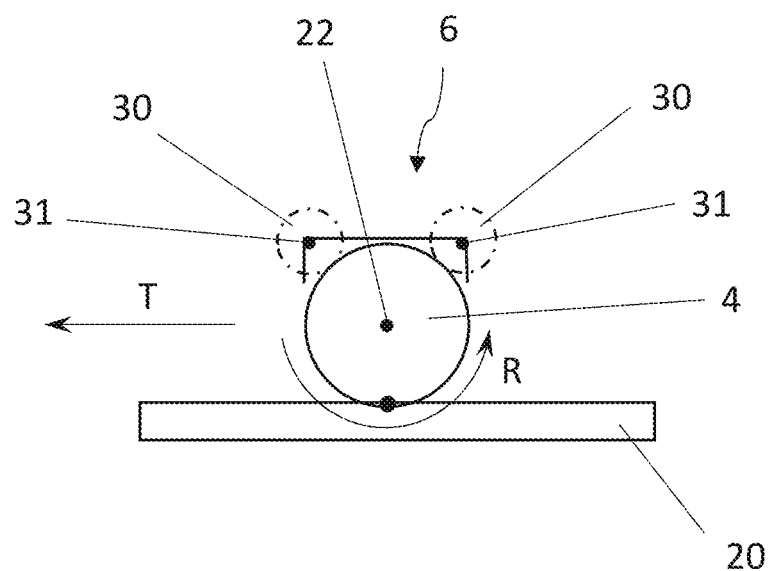
FIG. 3a is a cross-sectional view through a cell of the transport device with a received product.

During the translational movement of the products 4, the products 4 are brought into contact with a friction element 20. The friction element 20 here is realized as a stationary strip which, on the side that faces toward the products 4, has an elastomer material that comes into engagement with each product 4 by friction, in this case static friction. The friction element 20 may be adjustable so that it can be adapted to different product formats. The friction element 20 comes into direct contact with the peripheral surface 8 of the products 4 and causes the products 4 to rotate uniformly about an axis of rotation 22 of each product 4, which is perpendicular to the direction of transport T. The direction of rotation is indicated by the arrow R in FIG. 3a.

Figure 2:
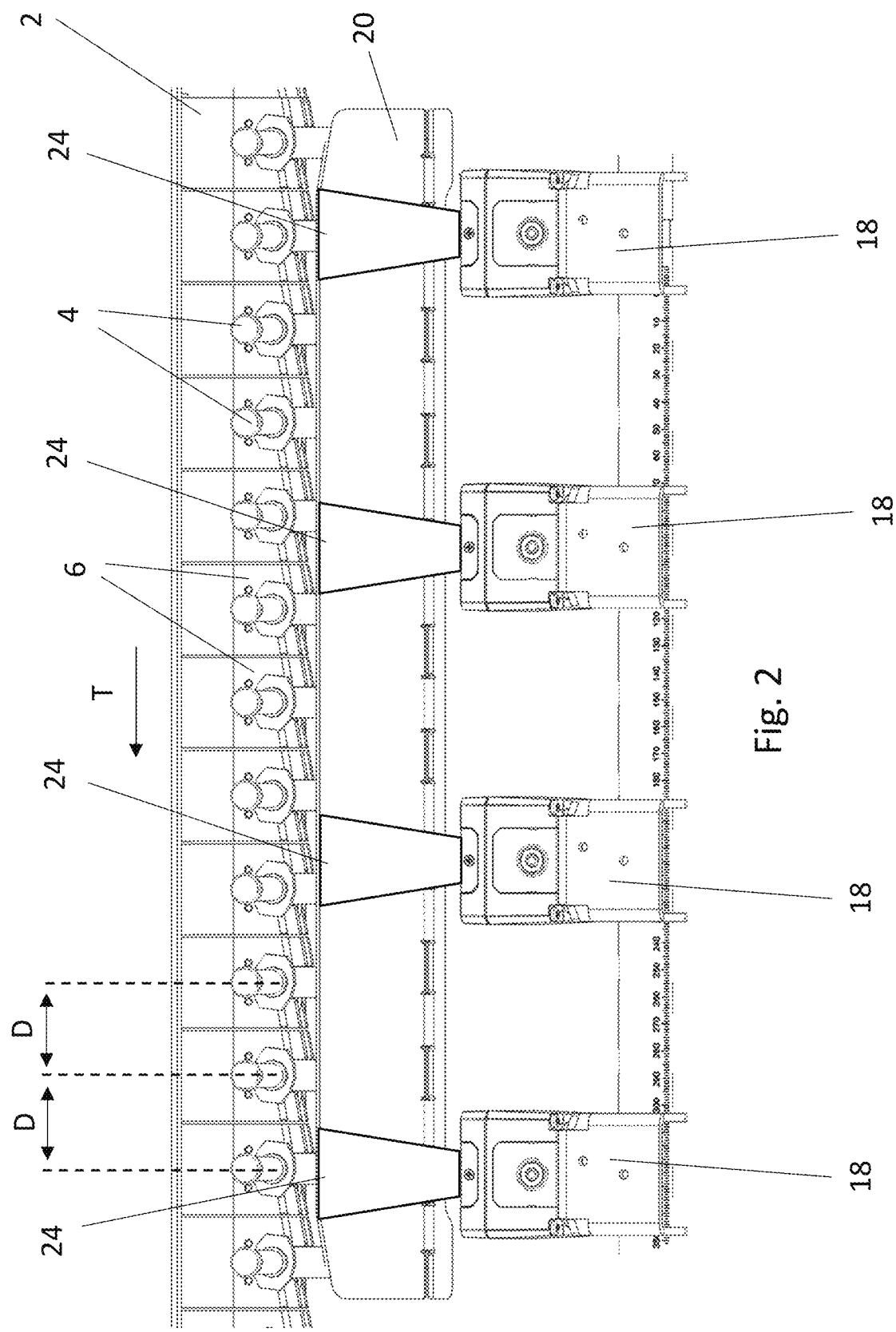
FIG. 2 is a plan view of the device from FIG. 1.

As can be seen from FIG. 2, each camera 18 has an active field of view 24 in which it can record the marking 10 of the product 4. The active fields of view 24 of the individual cameras 18 preferably do not overlap. An example of an active field of view 24 of a camera 18 in the region of the products 4 is represented in FIG. 4 by means of the inner rectangle as a section of a larger image area, or maximum field of view of the camera 18.

As can be seen from FIG. 1, the system also comprises an evaluation unit 26 for the images recorded by the cameras 18, as well as a controller 28 to which the data from the evaluation unit 26 are transmitted. The controller 28 may simultaneously be responsible for the operation of the transport device 2, or at least receive items of information concerning the operation of the transport device 2. The controller 28 may also trigger an activation interval of each camera 18.

As the individual products 4 pass along the friction element 20 and are made to rotate, the marking 10 applied to the peripheral surface 8 of each product 4 is read by means of the cameras 18 of the camera system 16. As can be see from FIGS. 3a and 3b, each product 4, in its receptacle 7 of the corresponding cell 6, is preferably mounted on rollers 30, the axes of rotation 31 of which are parallel to the axis of rotation 22 of the product 4.

Figure 3B:
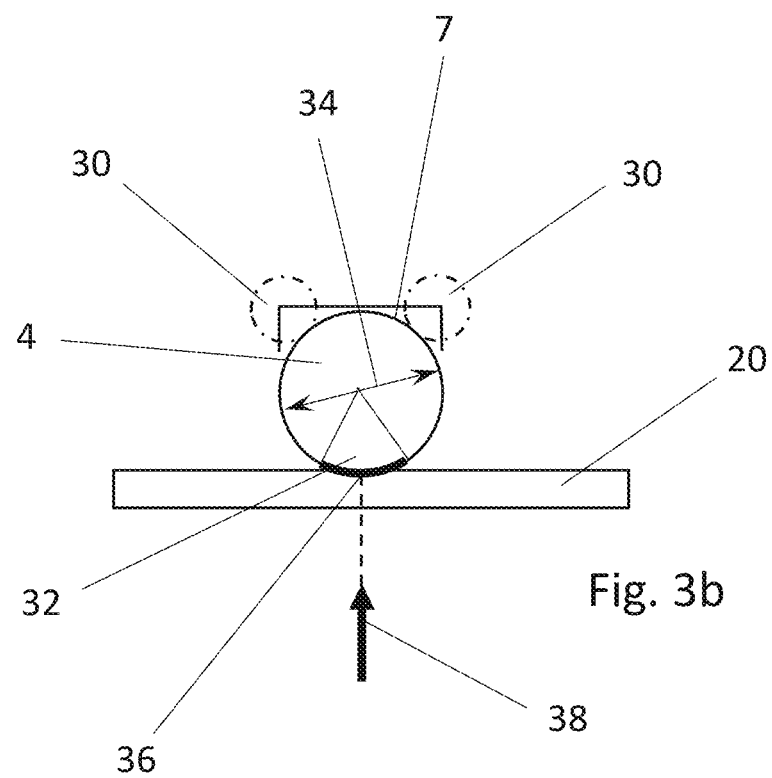
FIG. 3b corresponds to FIG. 3a, but includes additional geometrical particulars.

Each camera 18 recognizes the marking 10 only within a particular range of angles of rotation on both sides around a vertical zero line 36, to which the viewing direction 38 of the camera 18 is perpendicular (FIG. 3b). In FIG. 3b this angular range is denoted by the reference sign 32. This angular range 32 depends on the diameter 34 of the product 4 and is normally 60° or less in total. The frequency of image recording of each camera 18 must be high enough to effect at least one recording of the complete marking 10 in this angular range.

The individual cameras 18 are arranged in such a manner that the correlation between the translational speed of the transport device 2, the diameter 34 of the rotationally symmetrical region of the product 4, the distance D between the cells 6 of the transport device 2, the width B of the active field of view 24 of the cameras 18 in the region of the products 4, and the distance between the cameras 18 is such that a circumferential portion of the product 4 sensed by the active field of view 24 of each camera during the rotation of the product 4 differs from a circumferential portion of the product 4 sensed by the active field of view 24 of the other cameras 18 during the rotation of the product 4. The active fields of view 24 of the cameras 18 in this case each preferably overlap by the extension of the marking 10 in the peripheral direction of the peripheral surface 8. Thus, the cameras 18 together cover the entire circumference of the peripheral surface 8 of the product 4, irrespective of the original orientation of the product 4. The overlap of the active fields of view 24 serves to ensure that the complete marking 10 can be read in at least one active field of view 24 of a camera 18.

For reasons of efficiency, it is preferred that the width B of the active field of view 24 of each camera 18 in the region of the products 4 is as large as possible. At the same time, it is to be ensured that only one marking 10 can be read at a time in the active field of view 24 of a camera 18.

As can be seen from the recorded image in FIG. 4, in the example case represented the width B of the active field of view 24 in the region of the products 4 was selected to be of such a width that a second marking 10 of a further product 4 can already appear at the right edge of the active field of view 24, while the first marking 10 of a first product 4 is still at the left edge of the active field of view 24. However, the marking 10 located in the right edge cannot yet be read by the camera 18 due to its rotational position relative to the camera 18. The scenario shown therefore represents a limit situation of the maximum width B of the active field of view 24 if the camera 18 is intended to recognize only one marking 10 in a recorded image.

Depending on the geometrical parameters stated in more detail above, it may also be possible for a camera 18 to already sense the entire circumference of the peripheral surface 8 of the product 4 in its active field of view 24. Normally, however, between two and four cameras 18 will be needed due to the required high throughput.

The invention claimed is:

1. A method for identifying and tracking singly conveyed products, wherein the singly conveyed products are at least partially rotationally symmetrical and have a peripheral surface to which a marking is respectively applied, comprising the steps of:
  conveying the products by a transport device in a direction of transport, wherein the transport device has a plurality of successive cells, each of the cells receiving one of the products, wherein each product is rotatably received in the associated cell,
  during conveying, rotating each product by a friction element which, as the products are being conveyed, comes into engagement with each product by friction, and
  reading the marking applied to the peripheral surface of each product by a stationary camera system comprising a plurality of cameras including at least a first and a second camera, arranged in succession in the direction of transport, as the respective product is being rotated,
  wherein a correlation between a translational speed of the transport device, a diameter of the rotationally symmetrical region of each product, a distance between the cells of the transport device, a width of an active field of view of each camera in a region of the products, and a distance between the cameras is set in such a manner that a second circumferential portion of each product sensed by a second active field of view of the second camera during the rotation of the product which differs from a first circumferential portion of each product sensed by a first active field of view of the first camera during the rotation of the product,
  wherein the first and the second circumferential portion overlap at least by an extension of the marking in the circumferential direction of the rotationally symmetrical region of the product.

2. The method of claim 1, wherein the friction element is stationary.

3. The method of claim 2, wherein the friction element is a strip.

4. The method of claim 1, wherein the friction element has an elastomer material on a side which faces toward the products.

5. The method of claim 1, wherein each product is supported against its gravity in a receptacle of the cell, and rotating the product is effected about an axis of rotation of the product that is perpendicular to the direction of transport.

6. The method of claim 1, wherein each product is mounted, in the receptacle of the associated cell, on rollers, wherein the axis of rotation of each roller is parallel to the axis of rotation of the product.

7. The method of claim 1, wherein conveying is effected at a uniform translational speed, and rotating is effected at a uniform rotational speed.

8. The method of claim 1, wherein the first and second active fields of view do not spatially overlap in a region of the products.

9. The method of claim 1, wherein a width of the first and second active field of view in a region of the products is between 10 and 60% smaller than a distance between two cells of the transport device.

10. The method of claim 1, wherein an image recording frequency of the plurality of cameras is in the range of from 20 to 60 images per second.

11. The method of claim 1, wherein a time interval of image recording by each of the plurality of cameras is 1 to 30% shorter than a period in which the transport device advances by the distance between two cells.

12. The method of claim 1, wherein a translational speed of the transport device is at least 60 mm per second.

13. The method of claim 1, wherein a translational speed of the transport device is at least 100 mm per second.

14. A method for identifying and tracking singly conveyed products, wherein the singly conveyed products are at least partially rotationally symmetrical and have a peripheral surface to which a marking is respectively applied, comprising the steps of:
  conveying the products by a transport device in a direction of transport, wherein the transport device has a plurality of successive cells, each of the cells receiving one of the products, wherein each product is rotatably received in the associated cell,
  during conveying, rotating each product by a friction element which, as the products are being conveyed, comes into engagement with each product by friction, and
  reading the marking applied to the peripheral surface of each product by a stationary camera system comprising a plurality of cameras including at least a first and a second camera, arranged in succession in the direction of transport, as the respective product is being rotated,
  wherein a correlation between a translational speed of the transport device, a diameter of the rotationally symmetrical region of each product, a distance between the cells of the transport device, a width of an active field of view of each camera in a region of the products, and a distance between the cameras is set in such a manner that a second circumferential portion of each product sensed by a second active field of view of the second camera during the rotation of the product which differs from a first circumferential portion of each product sensed by a first active field of view of the first camera during the rotation of the product, wherein a width of the first and second active field of view in a region of the products is between 10 and 60% smaller than a distance between two cells of the transport device.

15. The method of claim 14, wherein the friction element is stationary.

16. The method of claim 14, wherein each product is supported against its gravity in a receptacle of the cell, and rotating the product is effected about an axis of rotation of the product that is perpendicular to the direction of transport.

17. A method for identifying and tracking singly conveyed products, wherein the singly conveyed products are at least partially rotationally symmetrical and have a peripheral surface to which a marking is respectively applied, comprising the steps of:
- conveying the products by a transport device in a direction of transport, wherein the transport device has a plurality of successive cells, each of the cells receiving one of the products, wherein each product is rotatably received in the associated cell,
- during conveying, rotating each product by a friction element which, as the products are being conveyed, comes into engagement with each product by friction, and
- reading the marking applied to the peripheral surface of each product by a stationary camera system comprising a plurality of cameras including at least a first and a second camera, arranged in succession in the direction of transport, as the respective product is being rotated, wherein a correlation between a translational speed of the transport device, a diameter of the rotationally symmetrical region of each product, a distance between the cells of the transport device, a width of an active field of view of each camera in a region of the products, and a distance between the cameras is set in such a manner that a second circumferential portion of each product sensed by a second active field of view of the second camera during the rotation of the product which differs from a first circumferential portion of each product sensed by a first active field of view of the first camera during the rotation of the product,
wherein a time interval of image recording by each of the plurality of cameras is 1 to 30% shorter than a period in which the transport device advances by the distance between two cells.

18. The method of claim 17, wherein the friction element is stationary.

19. The method of claim 17, wherein each product is supported against its gravity in a receptacle of the cell, and rotating the product is effected about an axis of rotation of the product that is perpendicular to the direction of transport.

* * * * *